United States Patent
Chen et al.

(10) Patent No.: US 8,774,645 B2
(45) Date of Patent: Jul. 8, 2014

(54) METHOD AND APPARATUS FOR CONTROLLING BIAS POINT OF DIFFERENTIAL QUADRATURE PHASE SHIFT KEYING DEMODULATOR

(75) Inventors: Jianhua Chen, Shenzhen (CN); Hong Yi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 61 days.

(21) Appl. No.: 13/634,469

(22) PCT Filed: Aug. 20, 2010

(86) PCT No.: PCT/CN2010/076218
§ 371 (c)(1),
(2), (4) Date: Oct. 30, 2012

(87) PCT Pub. No.: WO2011/113256
PCT Pub. Date: Sep. 22, 2011

(65) Prior Publication Data
US 2013/0044366 A1 Feb. 21, 2013

(30) Foreign Application Priority Data
Mar. 16, 2010 (CN) .......................... 2010 1 0138626

(51) Int. Cl.
*H04B 10/06* (2006.01)
(52) U.S. Cl.
USPC ............................ 398/202; 398/198; 398/206
(58) Field of Classification Search
None
See application file for complete search history.

(56) References Cited

U.S. PATENT DOCUMENTS

| 7,733,193 B2 | 6/2010 | Kershteyn et al. | |
|---|---|---|---|
| 8,041,228 B2 | 10/2011 | Charlet et al. | |
| 2008/0181620 A1* | 7/2008 | Sasaki | 398/198 |
| 2009/0003840 A1* | 1/2009 | Nahapetian et al. | 398/183 |
| 2009/0047028 A1* | 2/2009 | Terahara et al. | 398/188 |
| 2009/0226186 A1 | 9/2009 | Roman et al. | |

FOREIGN PATENT DOCUMENTS

| CN | 1972161 A | 5/2007 |
|---|---|---|
| CN | 101425849 A | 5/2009 |
| CN | 101800602 A | 8/2010 |

OTHER PUBLICATIONS

International Search Report issued Dec. 16, 2010 in priority International Patent Application No. PCT/CN2010/076218.

* cited by examiner

*Primary Examiner* — Hemang Sanghavi
(74) *Attorney, Agent, or Firm* — Jenkins, Wilson, Taylor & Hunt, P.A.

(57) ABSTRACT

Method and apparatus for controlling bias point of DQPSK demodulator are disclosed. The method comprises: step 1: respectively applying first and second bias voltages to I-path and Q-path, and applying identical pilot voltage signals to I-path and Q-path (S202); step 2: executing filtering processing on I-path and Q-path differential current signals collected by balance receiver and determining $\theta_I$ and $\theta_Q$ (S204); step 3: performing feedback control to first and second bias voltages respectively according to $\theta_I$ and $\theta_Q$ so that $\theta_I$ and $\theta_Q$ respectively reaches expected bias point values of I-path and Q-path (S206); executing step 2 and 3 cyclically at preset regular intervals (S208), so that $\theta_I$ and $\theta_Q$ remains consistently the expected bias point values of I-path and Q-path. The solution enables bias point of DQPSK demodulator to be locked at any expected bias point value, facilitates realization of digitization, and is not easily influenced.

13 Claims, 5 Drawing Sheets

METHOD AND APPARATUS FOR CONTROLLING BIAS POINT OF DIFFERENTIAL QUADRATURE PHASE SHIFT KEYING DEMODULATOR

CROSS-REFERENCE TO RELATED APPLICATIONS

This application is filed under the provisions of 35 U.S.C. §371 and claims the priority of International Patent Application No. PCT/CN2010/076218 filed on Aug. 20, 2010 and of Chinese Patent Application No. 201010138626.0 filed on Mar. 16, 2010 The disclosures of the foregoing international patent application and Chinese patent application are hereby incorporated by reference herein in their respective entireties.

FIELD OF THE INVENTION

The present invention relates to the field of optical communications, and in particular to a method and an apparatus for controlling a bias point of a Differential Quadrature Phase Shift Keying (DQPSK) demodulator.

BACKGROUND OF THE INVENTION

DQPSK is a Differential Quadrature Phase Shift Keying modulation method. In recent years, with the improvement of speed and the increase of capacity in optical transmission systems, more and more attention has been paid to the optical phase modulation method represented by the DQPSK.

FIG. 1 shows a structure diagram of a DQPSK demodulator according to the traditional art. As shown in FIG. 1, an input optical carrier can be expressed as: $E_i = E \exp j[\omega_0 t + \phi(t)]$, wherein E refers to field strength, $\omega_0$ refers to an angular frequency of the optical carrier, and $\phi(t)$ refers to a modulation phase. The principle of the modulation of the DQPSK demodulator is: encoding information to be transmitted in a differential phase, which is expressed by $\Delta\phi$, of continuous optical bits, wherein $\Delta\phi$ can be any value in $[0, \pi/2, \pi, 3\pi/2]$. Assumed that the phase of the $k-1^{th}$ optical bit pulse is $\theta(k-1)$, if the next bit is $\{0, 0\}$, $\theta(k)=\theta(k-1)+\pi$; if the next bit is $\{0, 1\}$, $\theta(k)=\theta(k-1)+\pi/2$; if the next bit is $\{1, 1\}$, $\theta(k)=\theta(k-1)$; if the next bit is $\{1, 0\}$, $\theta(k)=\theta(k-1)+3\pi/2$.

Based on above DQPSK modulation process, the principle of the demodulation of the DQPSK is: demodulating a received optical signal through the DQPSK demodulator to obtain two differential currents, wherein the two differential currents carry modulation phase difference of adjacent optical bits, and the transmitted bit information flow can be obtained according to the modulation phase difference. In order to reliably obtain an I-path differential current signal and a Q-path differential current signal which can be used for extracting the modulation phase difference, and then recover the transmitted information accurately, the phase difference of two arms on an I-path of the demodulator must strictly meet a demodulation requirement, namely the phase difference is $\pi/4+2n\pi$, and the phase difference of two arms on a Q-path of the demodulator must strictly meet a demodulation requirement, namely the phase difference is $-\pi/4+2n\pi$; or else, extra optical signal-to-noise ratio cost will be brought.

At present, in order to precisely control the phase difference between two arms on the I-path and the Q-path of the DQPSK demodulator, a control method commonly used in the traditional art is directly collecting current signals of a balance receiver, regulating bias voltages of the I-path and the Q-path of the demodulator at the same time to minimize the maximum value of the collected current signals, in this way, the DQPSK demodulator is locked at a correct bias point.

However, the above method is usually implemented through an analog circuit, so the response characteristic of a control loop is easily influenced by external environments, the reliability is poor, and the bias point can only be locked as$\pi/4$ and $-\pi/4$, but not other expected values.

SUMMARY OF THE INVENTION

The present invention mainly provides a method and an apparatus for controlling a bias point of a DQPSK demodulator, which solve the problems in the traditional art that it is easily influenced by external environments, the reliability is poor, and the bias point can only be locked as$\pi/4$ and $-\pi/4$, but not other expected values, due to adopting the analog circuit to implement the DQPSK modulation.

According to an aspect of the present invention, a method for controlling a bias point of a DQPSK demodulator is provided, which comprises: step 1: applying a first bias voltage to an I-path of the DQPSK demodulator, applying a second bias voltage to a Q-path of the DQPSK demodulator, and applying identical pilot voltage signals to the I-path and the Q-path respectively; step 2: executing filtering processing on an I-path differential current signal of the DQPSK demodulator collected by a balance receiver and determining a bias point real-time value $\theta_I$ of the I-path, and executing filtering processing on a Q-path differential current signal of the DQPSK demodulator collected by the balance receiver and determining a bias point real-time value $\theta_Q$ of the Q-path; and step 3: performing feedback control to the first bias voltage according to the bias point real-time value $\theta_I$, and performing feedback control to the second bias voltage according to the bias point real-time value $\theta_Q$, so that $\theta_I$ reaches an expected bias point value of the I-path and $\theta_Q$ reaches an expected bias point value of the Q-path; executing the step 2 and the step 3 cyclically at preset regular intervals, so that $\theta_I$ remains consistently the expected bias point value of the I-path and $\theta_Q$ remains consistently the expected bias point value of the Q-path.

According to another aspect of the present invention, an apparatus for controlling a bias point of a DQPSK demodulator is provided, which comprises: a pilot voltage signal generating module, configured to generate pilot voltage signals, and apply the pilot voltage signals to an I-path and a Q-path of the DQPSK demodulator respectively, wherein the I-path is also applied with a first bias voltage, and the Q-path is also applied with a second bias voltage; a bias point real-time value determining module, configured to execute filtering processing on an I-path differential current signal of the DQPSK demodulator collected by a balance receiver and determine a bias point real-time value $\theta_I$ of the I-path, and execute filtering processing on a Q-path differential current signal of the DQPSK demodulator collected by the balance receiver and determine a bias point real-time value $\theta_Q$ of the Q-path; and a feedback control module, coupled with the bias point real-time value determining module and configured to perform feedback control to the first bias voltage according to $\theta_I$, and perform feedback control to the second bias voltage according to $\theta_Q$, so that $\theta_I$ reaches an expected bias point value of the I-path and $\theta_Q$ reaches an expected bias point value of the Q-path.

Through the present invention, identical pilot voltage signals are applied to the I-path and the Q-path of the DQPSK demodulator respectively, the bias point real-time values of the I-path and the Q-path are determined respectively according to the differential current signals of the I-path and the Q-path of the DQPSK demodulator collected by the balance receiver, feedback control is performed to the bias voltages through the bias point real-time values so that the bias point real-time values are adjusted to reach the expected values. The technical solution of the present invention can lock the DQPSK demodulator at any expected bias point. In addition, the apparatus for controlling the bias point of the DQPSK receiving end of the present invention facilitates realization of digitization, compared with the traditional art, the solution saves cost, is flexible and simple, and is not easily influenced by external environments.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The present invention is described below with reference to the accompanying drawings and embodiments in detail. Note that, embodiments and features in the embodiments in the present application can be combined with each other if there is no conflict.

According to an embodiment of the present invention, first, a method for controlling a bias point of a DQPSK demodulator is provided.

Figure 2:
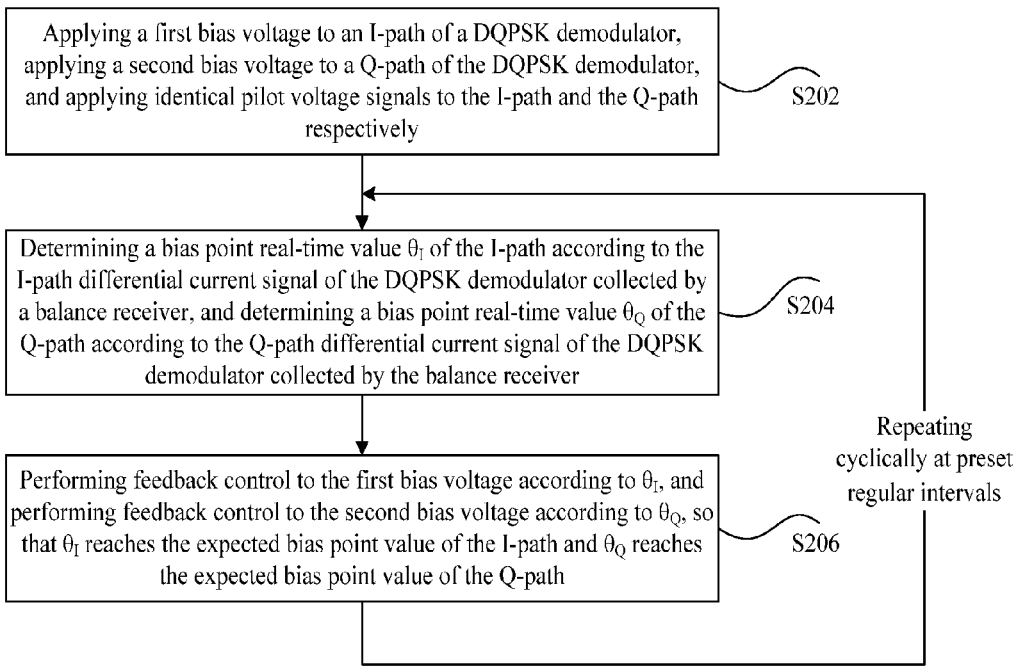
FIG. 2 shows a flowchart of a method for controlling a bias point of a DQPSK demodulator according to an embodiment of the present invention.

FIG. 2 shows a flowchart of a method for controlling a bias point of a DQPSK demodulator according to the embodiment of the present invention. As shown in FIG. 2, the method comprises:

Step S202: a first bias voltage is applied to an I-path of the DQPSK demodulator, a second bias voltage is applied to a Q-path of the DQPSK demodulator, and identical pilot voltage signals are applied to the I-path and the Q-path respectively;

Step S204: a bias point real-time value $\theta_I$ of the I-path is determined according to an I-path differential current signal of the DQPSK demodulator collected by a balance receiver, and a bias point real-time value $\theta_Q$ of the Q-path is determined according to a Q-path differential current signal of the DQPSK demodulator collected by the balance receiver; and Step S206: feedback control is performed to the first bias voltage according to the real-time value $\theta_I$, and feedback control is performed to the second bias voltage according to the real-time value $\theta_Q$, so that $\theta_I$ reaches an expected bias point value of the I-path and $\theta_Q$ reaches an expected bias point value of the Q-path.

The above steps from Step S204 to Step S206 are executed cyclically at preset regular intervals, so that $\theta_I$ remains consistently the expected bias point value of the I-path and $\theta_Q$ remains consistently the expected bias point value of the Q-path.

Figure 1:
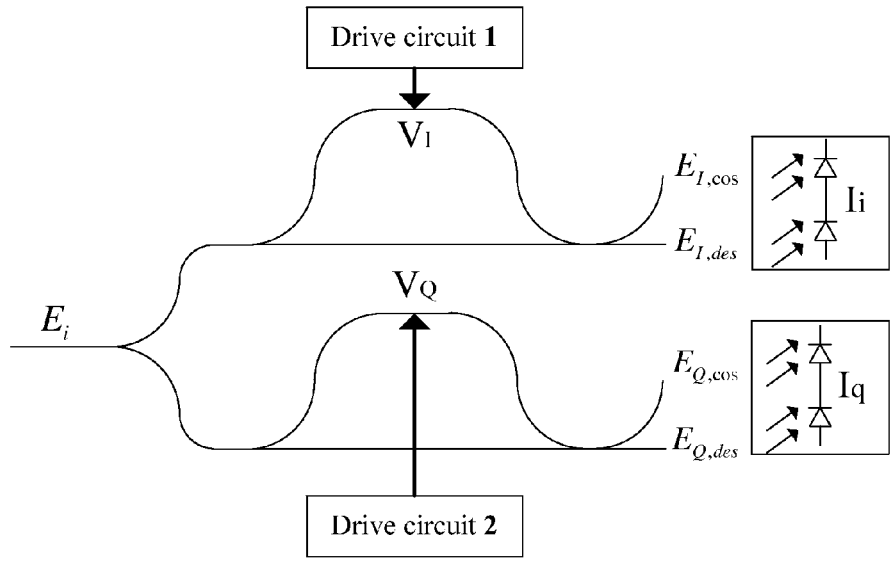
FIG. 1 shows a structure diagram of a DQPSK demodulator according to the traditional art.

With reference to the DQPSK demodulator as shown in FIG. 1, it can be seen from theoretical analysis that after an input optical carrier passes through the DQPSK demodulator and the balance receiver, the I-path differential current signal $i_I$ and the Q-path differential current signal $i_Q$ are output respectively, which are specifically expressed as the following formula (1):

$$\begin{bmatrix} i_I \\ i_Q \end{bmatrix} = RP \begin{bmatrix} \cos\left(\frac{2\pi V_I^2}{V_{FSR}^2} + \varphi_d\right) \\ \cos\left(\frac{2\pi V_Q^2}{V_{FSR}^2} + \varphi_d\right) \end{bmatrix} \quad (1)$$

Wherein R is the responsivity of the balance receiver, P is the input optical power, $\varphi_d$ is a modulation signal, $V_I$ and $V_Q$ are bias control voltages applied to the I-path and the Q-path respectively, and $V_{FRS}$ is a voltage value needed by adjusting a free spectral range.

For the DQPSK demodulation, it is required to control the bias point to make it meet the following condition, which is expressed as the following formula (2):

$$\begin{cases} \frac{2\pi V_I^2}{V_{FSR}^2} = \frac{\pi}{4} \\ \frac{2\pi V_Q^2}{V_{FSR}^2} = \frac{7\pi}{4} \end{cases} \quad (2)$$

wherein the bias point value $\theta_I$ of the I-path is $$\theta_I = \frac{2\pi V_I^2}{V_{FSR}^2},$$

and the bias point value $\theta_Q$ of the Q-path is $$\theta_Q = \frac{2\pi V_Q^2}{V_{FSR}^2}.$$

In the above Step S202, pilot signals $A \cos \omega t$ are applied to two extended arms of the I-path and the Q-path of the DQPSK demodulator; after the pilot signals are added, $i_I$, $i_Q$ are:

$$\begin{bmatrix} i_I \\ i_Q \end{bmatrix} = RP \begin{bmatrix} \cos\left(\frac{2\pi (V_I + A\cos\omega t)^2}{V_{FSR}^2} + \varphi_d\right) \\ \cos\left(\frac{2\pi (V_Q + A\cos\omega t)^2}{V_{FSR}^2} + \varphi_d\right) \end{bmatrix} = \quad (3)$$

$$RP\begin{bmatrix} \cos\left(\dfrac{2\pi V_I^2}{V_{FSR}^2} + k_I\cos\omega t + \varphi_d\right) \\ \cos\left(\dfrac{2\pi V_Q^2}{V_{FSR}^2} + k_Q\cos\omega t + \varphi_d\right) \end{bmatrix}$$

As the processing to the I-path and the processing to the Q-path do not influence each other, and their principles are the same, the following description takes the processing to the I-path for example. In formula (3), $$k_I = \frac{4\pi V_I A}{V_{FSR}^2},$$

amplitude A of the added pilot voltage signal is far less than the bias control voltage, so the quadratic term of A is ignored, and the following formula (4) is obtained through the formula (3):

$$\begin{aligned} i_I &= RP\cos\left(\frac{2\pi V_I^2}{V_{FSR}^2} + k_I\cos\omega t + \varphi_d\right) \quad (4)\\ &= RP\cos\theta_I \cos(k_I\cos\omega t + \varphi_d) - \\ &\quad RP\sin\theta_I \sin(k_I\cos\omega t + \varphi_d) \ \theta_I = \frac{2\pi V_I^2}{V_{FSR}^2}\\ &= RP\cos\theta_I \sum_{n=0}^{\infty} a_{2n}\cos(2n\omega t) - RP\sin\theta_I \sum_{m=0}^{\infty} b_{2m+1}\cos[(2m+1)\omega t] \end{aligned}$$

In the above formula (4), as the frequency of the added pilot signals is far less than the frequency of the modulation signal, the modulation signal can be filtered out through a low-pass filter or a band-pass filter. In the above formula (4), $a_{2n}$ and $b_{2m+1}$ are respectively coefficients after performing Fourier series expansion to $\cos(kI\cos\omega t)$ and $\sin(kI\cos\omega t)$. At this point, through deduction from the formula (1) to the formula (4), execution of Step 204 is ready.

In the above Step S204, multiple filtering is executed to the I-path differential current signal and the Q-path differential current signal of the DQPSK demodulator collected by the balance receiver, and current components after each filtering are obtained, and then an equation set is established according to the formula (4) and the obtained current components after filtering, in this way, the bias point real-time value $\theta_I$ of the I-path and the bias point real-time value $\theta_Q$ of the Q-path can be determined.

In the above Step S206, using the bias point real-time value $\theta_I$ of the I-path and the bias point real-time value $\theta_Q$ of the Q-path, feedback control can be performed to the bias voltage of the I-path and the bias voltage of the Q-path respectively; the differential current collected by the balance receiver changes by adjusting the voltage value, therefore $\theta_I$ and $\theta_Q$ are adjusted until they respectively reach the expected bias point values of the I-path and the Q-path.

As the bias point real-time values of the I-path and the Q-path will be influenced by change of external environments in real time, even if the bias points of the I-path and the Q-path are adjusted well, the bias point real-time values of the I-path and the Q-path will deviate due to the change of external environments. Thus, in order to ensure that the bias point real-time values of the I-path and the Q-path can be consistently locked at the expected values, it is required to repeat the process from Step S204 to Step S206 cyclically at a preset regular interval (set according to the actual situation of deviation of the bias points of system), so as to ensure $\theta_I$ remains consistently the expected bias point value of the I-path and $\theta_Q$ remains consistently the expected bias point value of the Q-path.

The current modulation condition of the DQPSK modulator requires that: the phase difference of two arms on the I-path of the DQPSK demodulator must be $\pi/4+2n\pi$, and the phase difference of two arms on the Q-path of the DQPSK demodulator must be $-\pi/4+2n\pi$. However, the existing method for controlling the bias point does not calculate the bias point real-time values of the I-path and the Q-path, but just concludes from theoretical deduction that: the DQPSK modulator is locked at a correct bias point only by directly collecting current signals of the balance receiver while regulating the bias voltages of the I-path and the Q-path of the demodulator to minimize the maximum value of the collected current signals. Furthermore, the existing method is implemented through an analog circuit, so the response characteristic of the control loop is easily influenced by external environments, and the reliability is poor. In addition, once the application scenarios of the DQPSK demodulator changes, especially if a future application requires locking the phase difference of two arms on the I-path and the Q-path of the DQPSK demodulator at other point, the existing method for bias point modulation cannot realize these situations. Thus, the existing method for bias point modulation shows its limitations.

In accordance with the above method for controlling the bias point in the embodiments of the present invention, through determining accurate bias point real-time values, the method can be implemented through a digital circuit. Compared with the traditional art, feedback control basis is more direct and more precise, and the DQPSK demodulator can be locked at any expected bias point.

Preferably, in above Step S204, the procedure of executing filtering processing on the I-path differential current signal of the DQPSK demodulator collected by the balance receiver and determining the bias point real-time value $\theta_I$ of the I-path, and executing filtering processing on the Q-path differential current signal of the DQPSK demodulator collected by the balance receiver and determining the bias point real-time value $\theta_Q$ of the Q-path comprises:

Step S2041: filtering processing is respectively executed on the I-path differential current signal and the Q-path differential current signal of the DQPSK demodulator to obtain three filtering components of the I-path differential current signal and three filtering components of the Q-path differential current signal; and Step S2042: $\theta_I$ is determined according to the three filtering components of the I-path differential current signal, and $\theta_Q$ is determined according to the three filtering components of the Q-path differential current signal.

Continuing to analyze the above steps with reference to the formulae (2) and (4) in detail, in order to meet the control condition of the bias point which is expressed as the formula (2) during the DQPSK demodulation, by taking the I-path for example, the $\theta_I$ is locked at $$\frac{\pi}{4}.$$

Therefore, the direct current component and any higher harmonic component of $i_I$ can be obtained by filtering $i_I$; and then an equation set comprising multiple equations can be obtained by respectively substituting the obtained direct current component and any higher harmonic component into the formula (4).

It can be seen from the formulae (3) and (4) that each equation in the obtained equation set has three variable values $\theta_I$, $k_I$ and RP, so the value of $\theta_I$ can be solved as long as the equation set comprises three equations, namely $\theta_I$ can be determined by executing only triple filtering processing on $i_I$ to obtain three different filtering components.

Preferably, the direct current component, the first harmonic component and the second harmonic component of $i_I$ are selected to determine $\theta_1$, and the direct current component, the first harmonic component and the second harmonic component of $i_I$ which are obtained after filtering are respectively substituted into the formula (4) to obtain the following formula (5) and formula (6):

$$\begin{cases} RP\cos\theta_I \times a_0 = A_0 \\ RP\sin\theta_I \times b_1 = A_1 \\ RP\cos\theta_I \times a_2 = A_2 \end{cases} \quad (5)$$

$$tg\theta_I = \frac{A_1}{A_0} \cdot \frac{a_0}{b_1} \quad (6)$$

In the formula (4), $a_0$ and $b_1$ are also relevant to the parameter $k_I$; first, the value of $k_I$ can be calculated from the equation set (5), and then the value of $\theta_1$ can be solved through the formula (6).

Similarly, the bias point real-time value $\theta_Q$ of the Q-path can be determined by the same method.

The above preferable method provided by the embodiment of the present invention can determine the actual bias point real-time values $\theta_I$ and $\theta_Q$ by executing the minimum-order filtering processing on current signals, which improves the efficiency of the feedback control of the bias point. In specific implementation process, the direct current component, the first harmonic component and the second harmonic component of $i_I$ are preferably selected to determine $\theta_I$, so as to achieve the feedback control of the bias point more easily.

Preferably, the procedure of performing feedback control to the first bias voltage according to $\theta_I$ and performing feedback control to the second bias voltage according to $\theta_Q$ comprises: regulating the first bias voltage according to the result of comparing $\theta_I$ with the expected bias point value of the I-path; and regulating the second bias voltage according to the result of comparing $\theta_Q$ with the expected bias point value of the Q-path.

In specific implementation process, when comparing $\theta_I$ with the expected bias point value of the I-path, if $\theta_I$ is less than the expected bias point value of the I-path, the bias voltage of the bias point of the I-path is increased; if $\theta_I$ is more than the expected bias point value of the I-path, the bias voltage of the bias point of the I-path is decreased; and then the bias point real-time value of the I-path after regulating the bias voltage of the bias point of the I-path is determined through the above method, until the real-time value is equal to the expected value. Similarly, the feedback control to the bias voltage of the Q-path can be performed through the method.

Performing feedback control to the bias voltages of the I-path and the Q-path by the above preferable method makes the feedback control basis more direct and more precise; besides, controls of the two paths do not interfere with each other.

Preferably, the expected bias point value of the I-path is $$\frac{\pi}{4},$$

and the expected bias point value of the Q-path is $$\frac{7\pi}{4}.$$

The method for controlling the bias point of the DQPSK demodulator provided by the embodiments of the present invention can control the bias point at any expected value. The expected bias point value of the I-path is set to $$\frac{\pi}{4},$$

and the expected bias point value of the Q-path is set to $$\frac{7\pi}{4},$$

so that the method is applicable to the existing DQPSK demodulator and has basic applicibility.

According to an embodiment of the present invention, an apparatus for controlling a bias point of a DQPSK demodulator is also provided.

Figure 3:
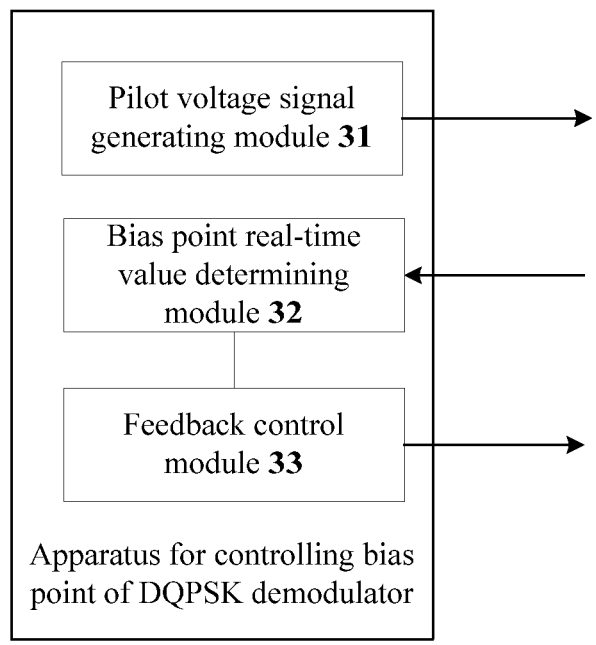
FIG. 3 shows a structure diagram of an apparatus for controlling a bias point of a DQPSK demodulator according to an embodiment of the present invention.

FIG. 3 shows a structure diagram of an apparatus for controlling a bias point of a DQPSK demodulator according to the embodiment of the present invention. As shown in FIG. 3, the apparatus comprises: a pilot voltage signal generating module 31, a bias point real-time value determining module 32 and a feedback control module 33; wherein the pilot voltage signal generating module 31 is configured to generate pilot voltage signals, and apply the pilot voltage signals to an I-path and a Q-path of the DQPSK demodulator respectively, wherein the I-path is also applied with a first bias voltage, and the Q-path is also applied with a second bias voltage;

the bias point real-time value determining module 32 is configured to execute filtering processing on an I-path differential current signal of the DQPSK demodulator collected by a balance receiver and determine a bias point real-time value $\theta_I$ of the I-path, and execute filtering processing on a Q-path differential current signal of the DQPSK demodulator collected by the balance receiver and determine a bias point real-time value $\theta_Q$ of the Q-path;

the feedback control module 33 is coupled with the bias point real-time value determining module 32 and configured to perform feedback control to the first bias voltage according to the real-time value $\theta_I$, and perform feedback control to the second bias voltage according to the real-time value $\theta_Q$, so that $\theta_I$ reaches an expected bias point value of the I-path and $\theta_Q$ reaches an expected bias point value of the Q-path.

Preferably, the pilot voltage signal generating module 31 can be implemented by, but not limited to, a digital algorithm processor (e.g., a Digital Signal Processor (DSP), a Field Programmable Gate Array (FPGA) and the like) and a high-precision Digital Analog converter (DA).

Figure 4:
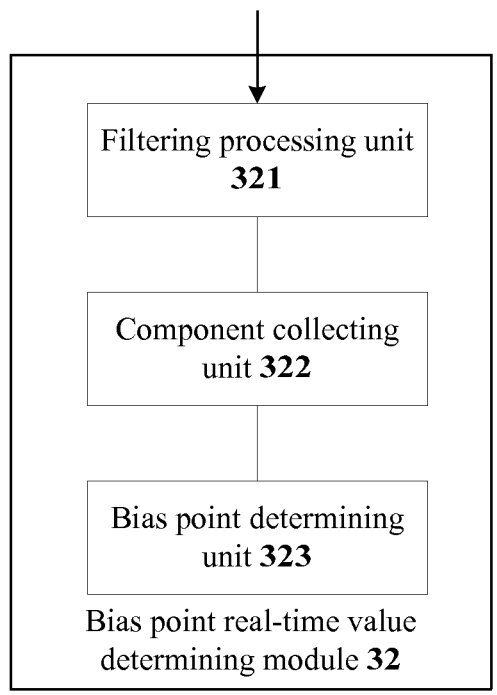
FIG. 4 shows a structure diagram of a real-time value determining module according to an embodiment of the present invention.

FIG. 4 shows a structure diagram of a real-time value determining module according to an embodiment of the present invention. As shown in FIG. 4, preferably, the bias point real-time value determining module 32 comprises: a filtering processing unit 321, a component collecting unit 322 and a bias point determining unit 323; wherein the filtering processing unit 321 is configured to respectively execute filtering processing on the I-path differential current signal and the Q-path differential current signal of the DQPSK demodulator collected by the balance receiver, and output three filtering components of the I-path differential current signal and three filtering components of the Q-path differential current signal;

the component collecting unit 322 is coupled with the filtering processing unit 321 and configured to collect the three filtering components of the I-path differential current signal and the three filtering components of the Q-path differential current signal after the filtering processing unit executes filtering processing;

the bias point determining unit 323 is coupled with the component collecting unit 322 and configured to determine $\theta_I$ according to the three filtering components of the I-path differential current signal, and determine $\theta_Q$ according to the three filtering components of the Q-path differential current signal.

Preferably, the component collecting unit 322 can be, but not limited to, a high-speed high-precision AD. The bias point determining unit 323 can be implemented by, but not limited to, a digital algorithm processing device (e.g., a DSP, a FPGA and the like).

Preferably, the three filtering components of the I-path differential current signal comprise, but not limited to: the direct current component of the I-path differential current signal, the first harmonic component of the I-path differential current signal and the second harmonic component of the I-path differential current signal; and the three filtering components of the Q-path differential current signal comprise, but not limited to: the direct current component of the Q-path differential current signal, the first harmonic component of the Q-path differential current signal and the second harmonic component of the Q-path differential current signal.

Figure 5:
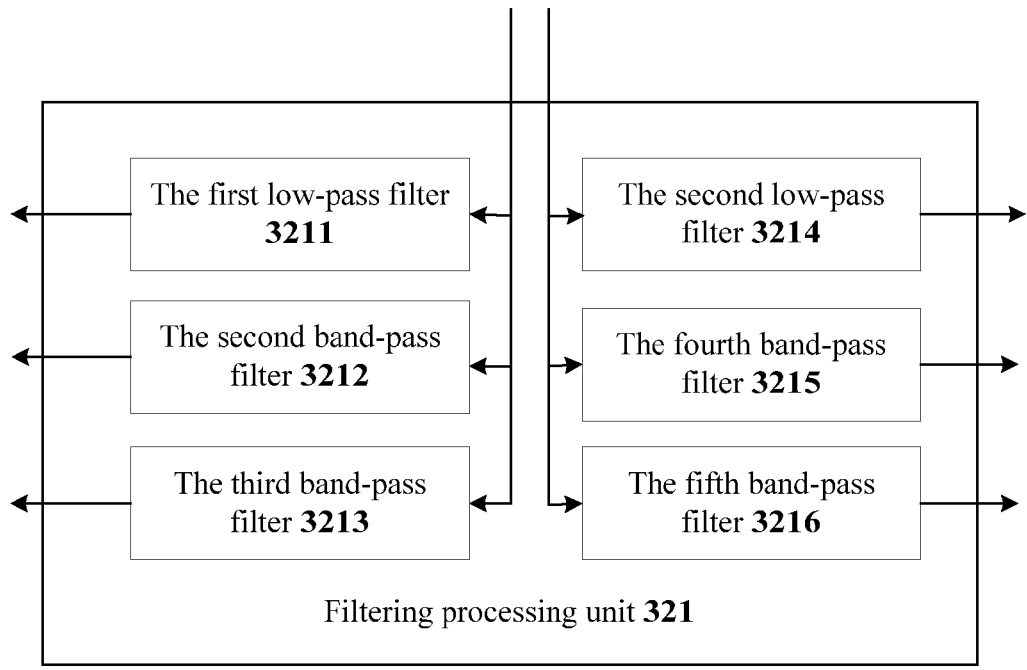
FIG. 5 shows a structure diagram of a filtering processing unit according to an embodiment of the present invention.

FIG. 5 shows a structure diagram of a filtering processing unit according to an embodiment of the present invention. If the direct current component of the I-path differential current signal, the first harmonic component of the I-path differential current signal and the second harmonic component of the I-path differential current signal are selected as the three filtering components of the I-path differential current signal, and if the direct current component of the Q-path differential current signal, the first harmonic component of the Q-path differential current signal and the second harmonic component of the Q-path differential current signal are selected as the three filtering components of the Q-path differential current signal, then preferably, the filtering processing unit 321 can be composed of, but not limited to, the following filters: a first low-pass filter 3211, which is configured to filter to obtain the direct current component of the I-path differential current signal; a second band-pass filter 3212, whose center frequency is w, and which is configured to filter to obtain the first harmonic component of the I-path differential current signal; a third band-pass filter 3213, whose center frequency is 2ω, and which is configured to filter to obtain the second harmonic component of the I-path differential current signal; a second low-pass filter 3214, which is configured to filter to obtain the direct current component of the Q-path differential current signal; a fourth band-pass filter 3215, whose center frequency is ω, and which is configured to filter to obtain the first harmonic component of the Q-path differential current signal; a fifth band-pass filter 3216, whose center frequency is 2ω, and which is configured to filter to obtain the second harmonic component of the Q-path differential current signal.

Figure 6:
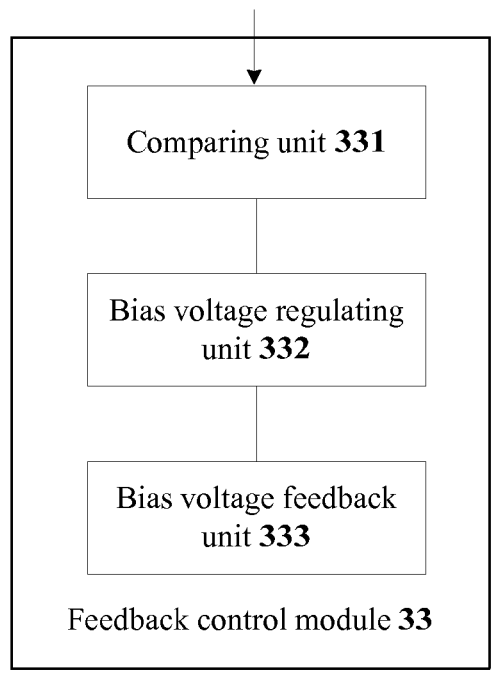
FIG. 6 shows a structure diagram of a feedback control module according to an embodiment of the present invention.

FIG. 6 shows a structure diagram of a feedback control module according to an embodiment of the present invention. Preferably, the feedback control module 33 comprises: a comparing unit 331, a bias voltage regulating unit 332 and a bias voltage feedback unit 333; wherein the comparing unit 331 is configured to compare $\theta_I$ with the expected bias point value of the I-path, and compare $\theta_Q$ with the expected bias point value of the Q-path; the bias voltage regulating unit 332 is coupled with the comparing unit 331 and configured to regulate the first bias voltage and the second bias voltage according to the comparison result of the comparing unit; and the bias voltage feedback unit 333 is configured to feed the regulated first bias voltage and the regulated second bias voltage back to the DQPSK demodulator.

Preferably, both the comparing unit 331 and the bias voltage regulating unit 332 can be implemented by, but not limited to, a digital algorithm processor (e.g., a DSP, a FPGA and the like); the bias voltage regulating unit 332 can be implemented by, but not limited to, a high-speed high-precision DA.

Preferably, the pilot voltage signal generating module 31, the bias point determining unit 323, the comparing unit 331 and the bias voltage regulating unit 332 can be either integrally set in a digital algorithm processor (e.g., a DSP, a FPGA and the like), or separately set in different digital algorithm processors in any combination.

A solution for controlling the bias point of the DQPSK demodulator is described below with reference to specific embodiments in detail.

Embodiment 1

Figure 7:
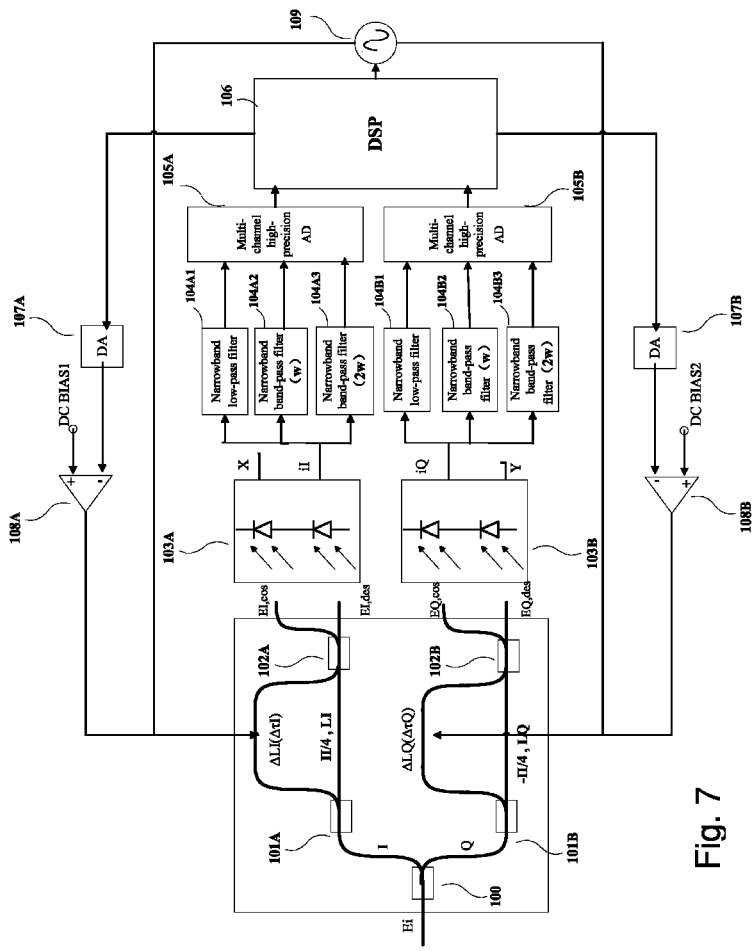
FIG. 7 shows a structure diagram of a system for controlling a bias point of a DQPSK demodulator according to embodiment 1 of the present invention.

FIG. 7 shows a structure diagram of a system for controlling a bias point of a DQPSK demodulator according to embodiment 1 of the present invention. As shown in FIG. 7, in the preferable embodiment:

an input optical signal $E_i$ is divided into a signal of I-path and a signal of Q-path after passing through a 3 dB coupler 100. The light of the I-path is divided into two paths of light through a 3 dB coupler 101A; the two paths of light pass through light paths of $L_I+\Delta L_I$ and $L_I$ respectively, and then the two paths of light are phase-shifted by $\pi/4$ and coupled through a coupler 102A to output $E_{I,cos}$ and $E_{I,des}$. $E_{I,cos}$ and $E_{I,des}$ pass through the balance receiver 103A to obtain a current $i_I$. Similarly, the light of the Q-path is divided into two paths of light through a 3 dB coupler 101B; the two paths of light pass through light paths of $L_Q+\Delta L_Q$ and $L_Q$ respectively, and then the two paths of light are phase-shifted by $-\pi/4$ and coupled through a coupler 102B to output $E_{Q,cos}$ and $E_{Q,des}$. $E_{Q,cos}$ and $E_{Q,des}$ pass through the balance receiver 103B to obtain a current $i_Q$.

The main body for bias point control is a DSP (106). First, the DSP controls to generate a pilot signal (109) whose frequency is ω, and applies the pilot signal to two extended arms of the DQPSK demodulator respectively. For the signal of the I-path, after the pilot signal is added, an alternate current signal whose fundamental frequency is the same as that of the pilot signal will be detected in the current $i_I$ of the balance receiver (103A). The direct current component, the first harmonic component and the second harmonic component included in $i_I$ are filtered out by using a narrow-band low-pass filter (104A1) and two narrow-band band-pass filters (104A2, 104A3) whose centre frequencies are respectively ω and 2ω; then, collection is performed through a multi-channel high-precision AD (105A) to obtain the direct current component amplitude $A_0=RP\cos\theta_I \times a_0$, the first harmonic component amplitude $A_1=RP\sin\theta_I \times b_1$ and the second harmonic component amplitude $A_2=RP\cos\theta_I \times a_2$; at last, the real-time value $\theta_I$ is obtained by using the DSP to simultaneously solve above three equations, and the bias point of the I-path is adjusted through an external high-speed high-precision DA (107A) until the real-time value $\theta_I$ is adjusted to $$\frac{\pi}{4},$$

in this way, the I-path is locked at a correct bias point. The way of locking the Q-path is the same as that of the I-path.

Embodiment 2

Figure 8:
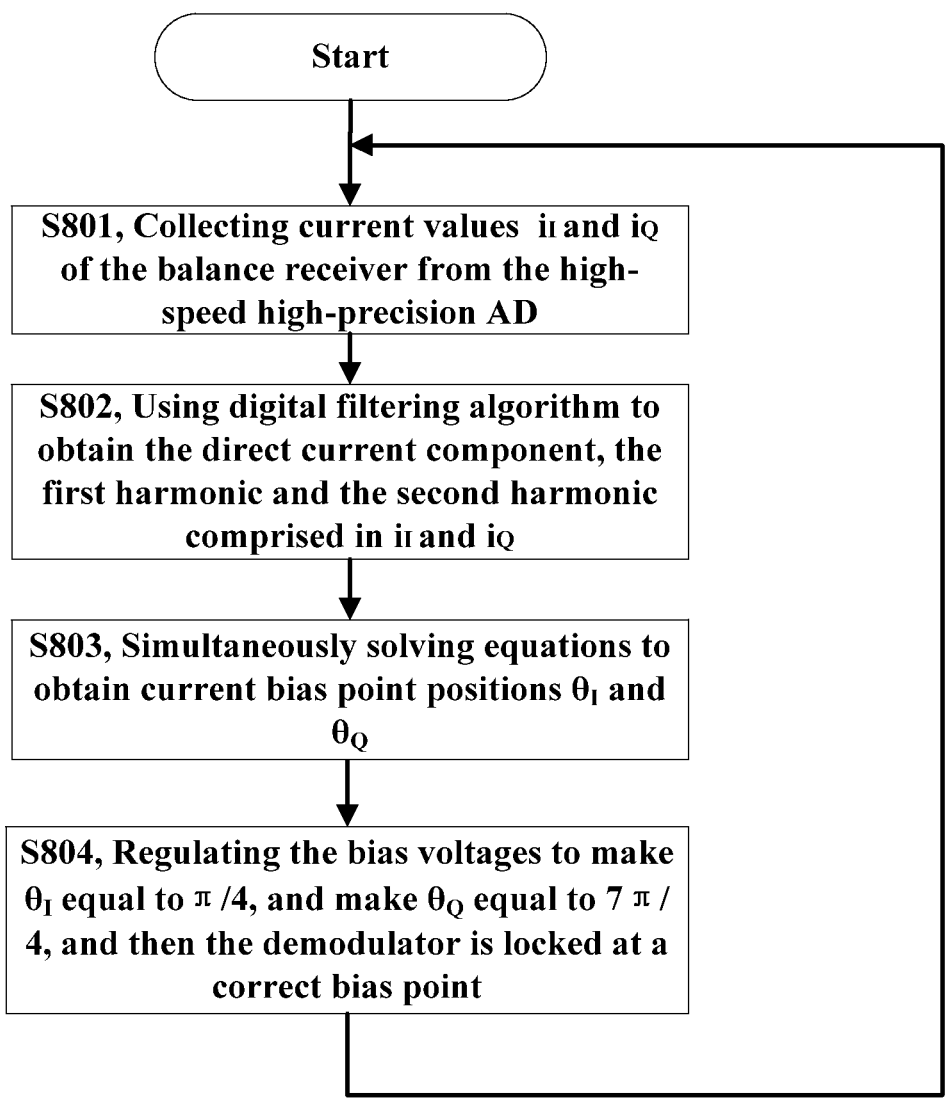
FIG. 8 shows a flowchart of controlling a bias point of a DQPSK demodulator according to embodiment 2 of the present invention.

FIG. 8 shows a flowchart of controlling a bias point of a DQPSK demodulator according to embodiment 2 of the present invention. In the embodiment, the bias point of the DQPSK demodulator is controlled by using a digital algorithm in the DSP. The specific process is as follows:

Step S801: current values $i_I$ and $i_Q$ of the balance receiver are collected from the high-speed high-precision AD;

Step S802: a digital filtering algorithm is used to obtain amplitudes of the direct current component, the first harmonic component and the second harmonic component of the current values $i_I$ and $i_Q$;

Step S803: the current bias point positions $\theta_I$ and $\theta_Q$ are obtained by simultaneously solving equations;

Step S804: the bias voltages are regulated to make $\theta_I$ equal to $$\frac{\pi}{4},$$

and make $\theta_Q$ equal to $$\frac{7\pi}{4},$$

in this way, the demodulator is locked at a correct bias point;
after a certain interval, steps from Step 801 to Step 804 are repeated.

It can be seen from the above description that the present invention achieves the following technical effects: the DQPSK demodulator can be locked at any expected bias point, and the realization of digitization is facilitated; compared with the traditional art, it has extremely obvious cost advantage, the control method is flexible and simple, and is not easily influenced by external environments.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A method for controlling a bias point of a Differential Quadrature Phase Shift Keying (DQPSK) demodulator, comprising:
   step 1: applying a first bias voltage to an I-path of the DQPSK demodulator, applying a second bias voltage to a Q-path of the DQPSK demodulator, and applying identical pilot voltage signals to the I-path and the Q-path respectively;
   step 2: executing filtering processing on an I-path differential current signal of the DQPSK demodulator collected by a balance receiver and determining a bias point real-time value $\theta_I$ of the I-path, and executing filtering processing on a Q-path differential current signal of the DQPSK demodulator collected by the balance receiver and determining a bias point real-time value $\theta_Q$ of the Q-path; and
   step 3: performing feedback control to the first bias voltage according to the bias point real-time value $\theta_I$, and performing feedback control to the second bias voltage according to the bias point real-time value $\theta_Q$, so that $\theta_I$ reaches an expected bias point value of the I-path and $\theta_Q$ reaches an expected bias point value of the Q-path; executing the step 2 and the step 3 cyclically at preset regular intervals, so that $\theta_I$ remains consistently the expected bias point value of the I-path and $\theta_Q$ remains consistently the expected bias point value of the Q-path.

2. The method according to claim 1, wherein the step of executing filtering processing on the I-path differential current signal of the DQPSK demodulator collected by the balance receiver and determining the bias point real-time value $\theta_I$ of the I-path, and executing filtering processing on the Q-path differential current signal of the DQPSK demodulator collected by the balance receiver and determining the bias point real-time value $\theta_Q$ of the Q-path comprises:
   respectively executing filtering processing on the I-path differential current signal and the Q-path differential current signal of the DQPSK demodulator collected by the balance receiver to obtain three filtering components of the I-path differential current signal and three filtering components of the Q-path differential current signal; and
   determining $\theta_I$ according to the three filtering components of the I-path differential current signal, and determining $\theta_Q$ according to the three filtering components of the Q-path differential current signal.

3. The method according to claim 2, wherein
   the three filtering components of the I-path differential current signal comprise: a direct current component of the I-path differential current signal, a first harmonic component of the I-path differential current signal and a second harmonic component of the I-path differential current signal; and
   the three filtering components of the Q-path differential current signal comprise: a direct current component of the Q-path differential current signal, a first harmonic component of the Q-path differential current signal and a second harmonic component of the Q-path differential current signal.

4. The method according to claim 2, wherein the expected bias point value of the I-path is $$\frac{\pi}{4},$$

and the expected bias point value of the Q-path is $$\frac{7\pi}{4}.$$

5. The method according to claim 3, wherein the expected bias point value of the I-path is $$\frac{\pi}{4},$$

and the expected bias point value of the Q-path is $$\frac{7\pi}{4}.$$

6. The method according to claim 1, wherein performing feedback control to the first bias voltage according to the bias point real-time value $\theta_I$, and performing feedback control to the second bias voltage according to the bias point real-time value $\theta_Q$ comprises:
regulating the first bias voltage according to a result of comparing $\theta_I$ with the expected bias point value of the I-path; and
regulating the second bias voltage according to a result of comparing $\theta_I$ with the expected bias point value of the Q-path.

7. The method according to claim 6, wherein the expected bias point value of the I-path is $$\frac{\pi}{4},$$

and the expected bias point value of the Q-path is $$\frac{7\pi}{4}.$$

8. The method according to claim 1, wherein the expected bias point value of the I-path is $$\frac{\pi}{4},$$

and the expected bias point value of the Q-path is $$\frac{7\pi}{4}.$$

9. An apparatus for controlling a bias point of a DQPSK demodulator, comprising:
a pilot voltage signal generating module, configured to generate pilot voltage signals, and apply the pilot voltage signals to an I-path and a Q-path of the DQPSK demodulator respectively, wherein the I-path is also applied with a first bias voltage, and the Q-path is also applied with a second bias voltage;
a bias point real-time value determining module, configured to execute filtering processing on an I-path differential current signal of the DQPSK demodulator collected by a balance receiver and determine a bias point real-time value $\theta_I$ of the I-path, and execute filtering processing on a Q-path differential current signal of the DQPSK demodulator collected by the balance receiver and determine a bias point real-time value $\theta_Q$ of the Q-path; and
a feedback control module, coupled with the bias point real-time value determining module and configured to perform feedback control to the first bias voltage according to $\theta_I$, and perform feedback control to the second bias voltage according to $\theta_Q$, so that $\theta_I$ reaches an expected bias point value of the I-path and $\theta_Q$ reaches an expected bias point value of the Q-path.

10. The apparatus according to claim 9, wherein the bias point real-time value determining module comprises:
a filtering processing unit, configured to respectively execute filtering processing on the I-path differential current signal and the Q-path differential current signal of the DQPSK demodulator collected by the balance receiver, and output three filtering components of the I-path differential current signal and three filtering components of the Q-path differential current signal;
a component collecting unit, coupled with the filtering processing unit and configured to collect the three filtering components of the I-path differential current signal and the three filtering components of the Q-path differential current signal after the filtering processing unit executes filtering processing; and
a bias point determining unit, coupled with the component collecting unit and configured to determine $\theta_I$ according to the three filtering components of the I-path differential current signal, and determine $\theta_Q$ according to the three filtering components of the Q-path differential current signal.

11. The apparatus according to claim 10, wherein
the three filtering components of the I-path differential current signal comprise: a direct current component of the I-path differential current signal, a first harmonic component of the I-path differential current signal and a second harmonic component of the I-path differential current signal; and
the three filtering components of the Q-path differential current signal comprise: a direct current component of the Q-path differential current signal, a first harmonic component of the Q-path differential current signal and a second harmonic component of the Q-path differential current signal.

12. The apparatus according to claim 11, wherein the filtering processing unit comprises:
a first low-pass filter, configured to filter to obtain the direct current component of the I-path differential current signal;
a second band-pass filter, whose center frequency is ω, configured to filter to obtain the first harmonic component of the I-path differential current signal;

a third band-pass filter, whose center frequency is $2\omega$, configured to filter to obtain the second harmonic component of the I-path differential current signal;

a second low-pass filter, configured to filter to obtain the direct current component of the Q-path differential current signal;

a fourth band-pass filter, whose center frequency is $\omega$, configured to filter to obtain the first harmonic component of the Q-path differential current signal; and a fifth band-pass filter, whose center frequency is $2\omega$, configured to filter to obtain the second harmonic component of the Q-path differential current signal.

13. The apparatus according to claim 9, wherein the feedback control module comprises:

a comparing unit, configured to compare $\theta_I$ with the expected bias point value of the I-path, and compare $\theta_Q$ with the expected bias point value of the Q-path;

a bias voltage regulating unit, coupled with the comparing unit and configured to regulate the first bias voltage and the second bias voltage according to a comparison result of the comparing unit; and a bias voltage feedback unit, configured to feed the regulated first bias voltage and the regulated second bias voltage back to the DQPSK demodulator.

* * * * *